United States Patent

[11] 3,536,254

[72] Inventor Robert C. Knight
Indian Hills, Colorado
[21] Appl. No. 783,948
[22] Filed Dec. 16, 1968
[45] Patented Oct. 27, 1970
[73] Assignee Marathon Oil Company
Findlay, Ohio
a corporation of Ohio

[54] FLUID SEPARATOR
11 Claims, 4 Drawing Figs.
[52] U.S. Cl. .................................................... 233/21,
233/19
[51] Int. Cl. ....................................................... B04b 11/00
[50] Field of Search ............................................ 233/16, 19,
21, 20, 23, 28, 34, 40, 45

[56] References Cited
UNITED STATES PATENTS
2,543,242  2/1951  Kent.
2,761,618  9/1956  Fitzsimmons.
3,126,338  3/1964  Steinacker.
3,161,593  12/1964  Schiel.

*Primary Examiner* — Robert W. Jenkins
*Attorney* — Joseph C. Herring, Jack L. Hummel and Richard C. Willson, Jr.

ABSTRACT: Mixtures comprising hydrocarbon, water, and solid particles are continuously separated into distinct phases by injecting the mixture downwardly through a fluid input pipe centrally disposed within a rotating centrifugal drum separator having a concentric column about the input pipe, all within a reservoir containing water. The mixture is discharged through openings into the centrifugal drum separator which separates the phases, sending the lighter hydrocarbons upwardly through the annulus formed by the concentric column and input pipe to a hydrocarbon delivery line to be recovered. The heavier water and solid particles are centrifugally separated and discharged through outlets at the bottom portion of the centrifugal drum member where the solid particles are drained through a sediment line in the bottom of the reservoir. The water flows into the reservoir, the level and amount of which is controlled by a static head adjacent the reservoir and in fluid communication with it through a liquid port in the bottom portion of the reservoir tank. Controlling the water level in the tank allows one to maintain the water-hydrocarbon interface level in the centrifugal drum at a point intermediate the bottom and top portions of the centrifugal drum to insure substantially complete separation of the phases and to allow separation at any desired mixture input rate.

INVENTOR
ROBERT C. KNIGHT

BY

*Jack L. Hummel*

ATTORNEY

Patented Oct. 27, 1970

INVENTOR
ROBERT C. KNIGHT

BY

*Jacob L. Hummel*
ATTORNEY 3,536,254

FLUID SEPARATOR

BACKGROUND OF THE INVENTION

This invention relates to a process for separating mixtures of water and hydrocarbon. More particularly, this process relates to separation of mixtures of oil, water, and any solid particles suspended therein.

To meet the requirements of oil refineries as to the condition of oil to be purchased, it is often necessary for the operator at the oil site to treat the oil to meet the standards prior to shipment. The refinery is primarily concerned with the basic sediment and water (BS and W) content of the crude. Various kinds of conventional treaters such as vertical treaters, horizontal treaters, gas fired heaters, and electrically-heated treaters have been employed by the operator. Most of the treaters require heat and operate on a batch basis, so that a pumper must fire the treater and circulate fluid from a storage tank to the treater and process it at a given rate at a capacity of fluid the treater is able to handle. Although many of these treaters are efficient, they are also usually expensive to operate and troublesome.

These and other problems are solved by employing the treater and separation process of the present invention. Some of the advantages which this invention offers are: the separator operates continuously, handling the well products as they are produced and utilizing the well head pressure to deliver the fluid into, and from, the separator; once the separator has been primed to handle a particular fluid input condition, it will be self controlled and operating; by handling the fluid directly from the well bore, no additional heating will be required (conventional treaters operate at approximately 150°F. and must handle "cold" stock tank fluid and during the winter this can create some sizeable fuel bills); the design of the separator makes it virtually impossible for any oil to leave the separator, other than by the route intended, whereas conventional treaters sometimes malfunction and pump oil to the pits; there is no need for "primary water knockout" needed in normal treating operations when the well head fluid has a high water content; and, any hydrocarbon-water mixture ratio or input rate can be handled by the separator without loss of efficiency of separation.

U.S. Pat. No. 3,126,338 to Steinacker shows a centrifugal separator fluid being admitted to the separator through an inlet pipe and oil moving outward through concentric passage around the inlet pipe. However, no means are disclosed which will insure complete separation of the mixture of fluids such as by the use of a variable level water reservoir control.

SUMMARY OF THE INVENTION

These and other advantages are obtained by using the separation process of the present invention. I have found that mixtures of oil, water, and any solids present, may be continuously separated into substantially pure oil and pure water phases with provision for sediment disposal with the use of a single apparatus directly adaptable to a pipe connected to a production well head.

BRIEF DESCRIPTION OF THE DRAWINGS

The invention will be more fully understood by reference to the accompanying drawings, in which.

DESCRIPTION OF THE INVENTION

Figure 1:
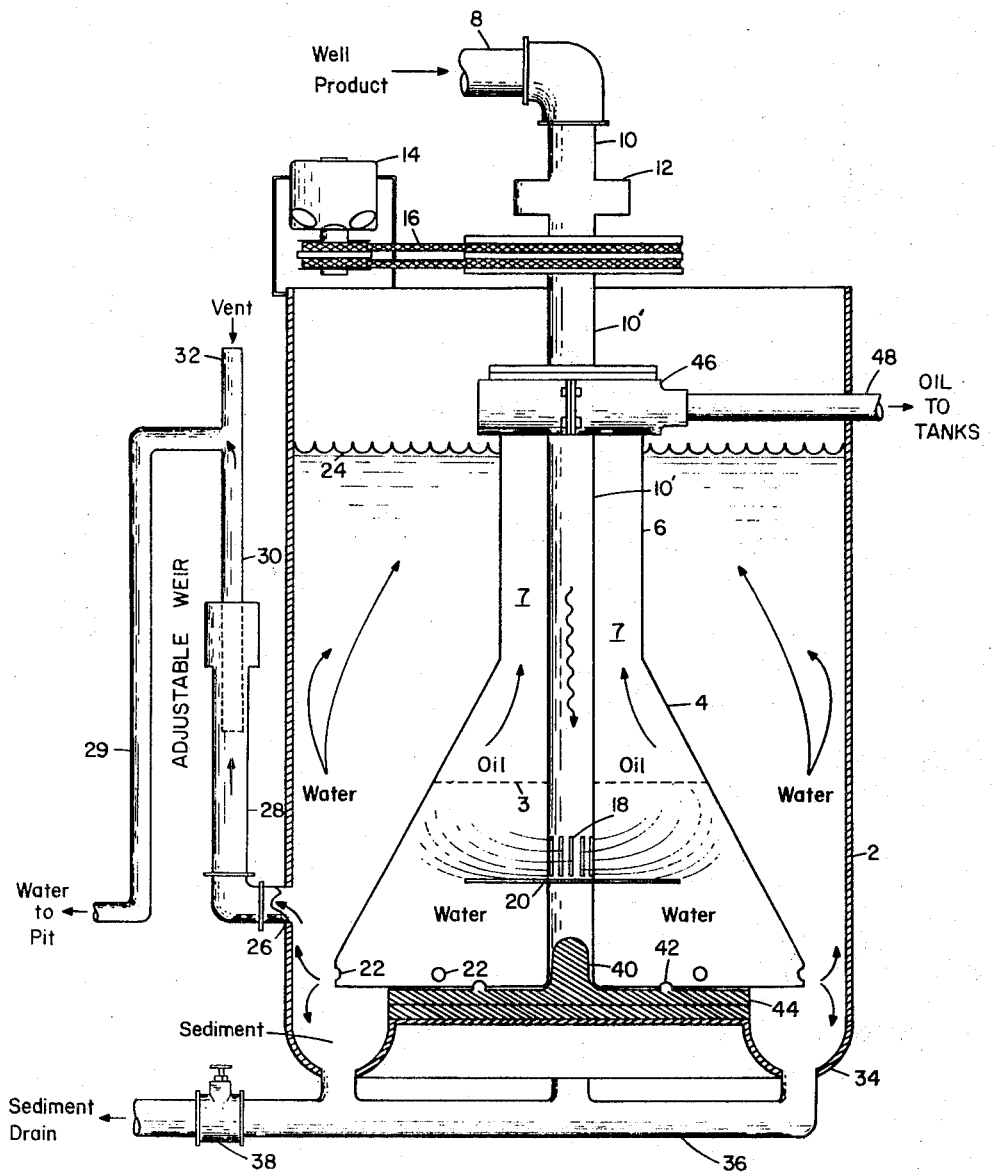
FIG. 1 is a vertical sectional view of the separating apparatus.

Referring to FIG. 1, pipe conduit 8 is connected to the head of a producing well providing a mixture of oil, water, and dispersed solids. Some well heads may produce oil and water in an emulsified state, with or without additional components, which would preferably be pretreated, for example as by addition of chemicals injected into the flow lines by means of a small injection pump which is attached to, and operated by, a pump jack. Various other types of fluid conditions should be treated so as to produce a mixture comprising basically oil, water, and with or without dispersed solids, which will be injected into vertical pipe 10 and enter the centrifugal drum 4 through openings 18 and shielded by plate 20. This plate precludes the natural pressure of the fluid emanating from the openings 18 from projecting into the lower portion of the drum 4 and possibly escaping through the water outlets 22. The entire inverted shaped centrifugal drum 4 sits in open tank 2 containing water and rotating about shaft 40 and bearings 42 seated on base 44 by means of a motor 14 mounted on the side of the tank and belt driven 16. Alternate means for rotating and seating the drum may be utilized, such as by using a chain drive rather than a belt drive. The uppermost rotating portion of the centrifugal drum unit 4 terminates in seat 12.

The drum is provided with a neck 6 forming a concentric column about the input pipe 10 forming annular space 7. The greater the mixture input rate, the greater should be the width of annular space 7 to accommodate all of the oil component. Upon operation of the separator, oil builds up in said annular region 7 until it reaches the discharge area 46 where the fluids are discharged into delivery line 48 for recovery. The heavier water and solid particles, by centrifugal action and gravity, are spun out of outlets 22 peripherally spaced about the bottom portion of the centrifugal drum 4. The outlets should be large enough to prevent any excessive build-up in pressure due to clogging. The solid particles thus discharged descend into sediment trough 34 and into drain 36 via a plurality of spaced holes, not shown. The drain lines can be periodically cleaned out by opening valve 38, allowing water from the tank 2 to flush out the sediment into a pit, not shown.

The water discharged through outlets 22 enters the open (or vented) tank 2 which is in fluid communication with an adjustable weir 30 adjacent the tank via port 26. The weir is composed of a moveable portion 29 and a stationary portion 28, slideably connected with appropriate sealing means. Vent 32 prevents any syphoning action. The water level 24 in the tank is maintained at any desired level by vertically moving portion 29 of the adjustable weir. Excess water overflows into the pit for disposal.

Control of the water level 24 is essential since this water level will determine the level of the oil-water interface 3 within the centrifugal drum 4. This interface level 3 must be maintained at a level intermediate the base and top portions of the centrifugal drum. In other words, the interface level should be above the outlets 22 and below the neck 6 to insure complete separation of the oil and water phases. For instance, if the interface level were allowed to be somewhere in the neck 6 of the separator, the effluent in line 48 would be contaminated with water and possibly some sediment. Similarly, if the interface level 3 is below the level of outlets 22, some oil will be discharged to the tank and/or pit. These disadvantageous results are prevented by controlling the interface level 3 by in turn controlling the water level 24 in the tank 2. Means for observing this interface level may be employed, such as by using a translucent glass centrifugal drum, viewed through a port hole in the side of the tank.

Figure 2:
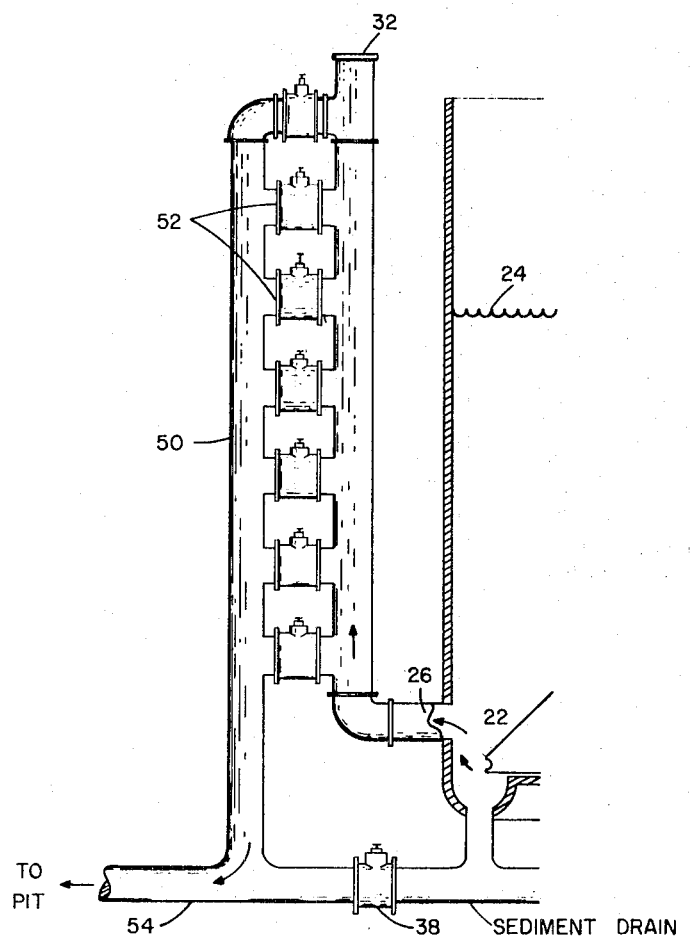
FIG. 2 showing an alternative method for maintaining a desired water level from the one shown in FIG. 1.

In FIG. 2, a device 50 is shown which is an alternative embodiment for controlling the water level 24 and may be used as a replacement of the adjustable weir 30 of FIG. 1. The device 50 consists of a stack of crossover lines fitted with valves in fluid communication with tank 2 via port 26. In practice, all of the valves are closed which are below the desired water level 24. The water will then travel up the stack, and overflow at the point at which the particular valve is open, traveling to the pit. For convenience, the sediment drain, controlled by valve 38, is connected to the water overflow line for concurrent removal to the pit via line 54.

Figure 3:
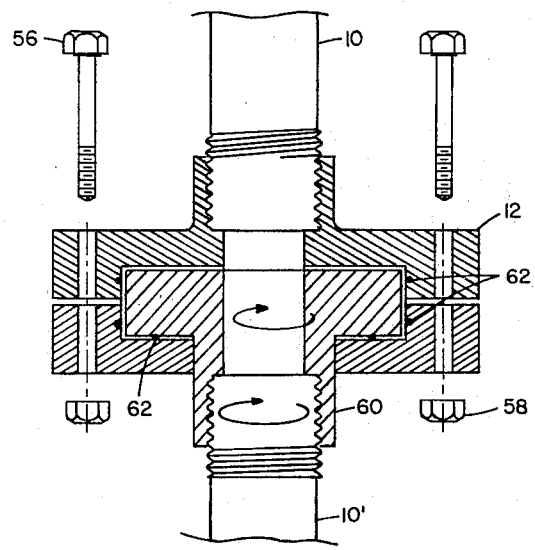
FIG. 3 is a detailed vertical sectional view of the seat 12 of FIG. 1.

FIG. 3 shows a detailed drawing of the seat 12 which houses the uppermost rotating portion of the centrifugal separator. As shown, the input line 10 threads into the stationary seat 12. The head 60 of the rotating shaft 10' revolves in seat 12 upon suitable bearings 62. The whole assembly is securely fastened by bolts 56 and nut 58.

Figure 4:
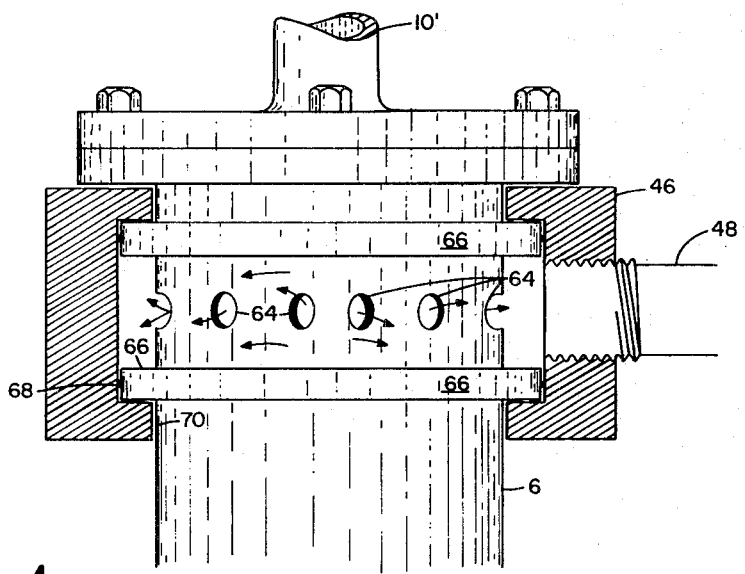
FIG. 4 is a detailed view of the oil discharge arrangement 46 of FIG. 1.

In FIG. 4, a detailed view of the interior of oil delivery means 46 is shown where the neck 6 has spaced portholes 64 which discharge the oil into delivery line 48. The revolving neck 6 is fitted with shoulders 66 sealed from holder 46 by O-rings 68. This entire neck assembly is bolted to input line 10'. The level of the delivery line is preferably below the top of the tank to insure that oil will be produced therethrough.

The BS and W content of the oil recovered through line 48 by this process is negligible and the oil requires no further treatment and is used directly by the refinery. Furthermore, no oil accumulates in the pit or in the tank.

Various other methods of housing the rotating member 4, adjusting the water level 24, and delivering the oil 46 may be used without departing from the novel method of separation of this invention.

The above described preferred embodiments of this invention are meant to illustrate the invention but not to limit it in any way. A variety of variations and modifications will become apparent to those upon a reading of this specification who are skilled in the art. For instance, the well product mixture could be injected into the separator from below, up through shaft 10'. It would then be desirable to locate an additional plate 20 parallel to the first and above the outlets 18 to insure lateral ejection. The portion of the injection pipe 10' would then be terminated at this point and there wouldn't be an annulus 7 as described in the preferred embodiments hereinbefore. Other attendant modifications would be obvious. The scope of the invention is meant to be limited only by the appended claims and equivalents thereof.

I claim:

1. A process for separating a mixture comprising hydrocarbon and water into their respective phases, comprising in combination the steps of:
    a. injecting the mixture through a fluid input conduit centrally disposed within a rotating centrifugal drum separator having an upwardly extending neck portion for removal of oil and said drum having peripheral outlets at its bottom portion and said drum and neck portion being disposed within a reservoir containing water;
    b. adjustably maintaining the level of water in said reservoir to form a hydrocarbon-water interface level within the drum so as to maintain said interface level intermediate the bottom and neck portions of said drum to insure complete separation of the hydrocarbon and water phases; and
    c. recovering the hydrocarbon from the neck portion of said separator.

2. A process for separating a mixture comprising hydrocarbon and water into their respective phases, comprising in combination the steps of:
    a. downwardly injecting the mixture through a fluid input conduit centrally disposed within a rotating centrifugal drum separator having an upwardly extending concentric column about the input conduit within a reservoir containing water, said input conduit having openings intermediate the base and top portion of said drum, said drum having peripheral outlets at its bottom portion;
    b. adjustably maintaining the level of water in said reservoir to form a hydrocarbon-water interface level within the drum so as to maintain said interface level intermediate the base and top portion of said drum to insure complete separation of the hydrocarbon and water phases; and
    c. recovering the hydrocarbon through the annulus formed by said input conduit and said concentric column.

3. The process of claim 2 wherein the mixture comprises in addition, solid particles which are expelled from the centrifugal drum through the peripheral outlets and are drained from the bottom of the reservoir through discharge outlets.

4. The process of claim 3 wherein the mixture comprising hydrocarbon, water, and solid particles are obtained directly from the well head of a hydrocarbon-producing formation.

5. The process of claim 2 wherein the water level in the reservoir is regulated by manipulation of an adjustable weir outside the tank, allowing excess water to overflow and be discharged from the system.

6. The process of claim 2 wherein the water level in the reservoir is regulated by means of a series of cross-over lines fitted with valves.

7. The process of claim 2 wherein the separation process is operated in a continuous manner.

8. The process of claim 2 wherein the mixture comprising hydrocarbon and water is obtained directly from the well head of a hydrocarbon-producing formation.

9. The process of claim 2 wherein a substantially horizontal plate is fastened to the input pipe below said openings in said input pipe causing an outward deflection of the input mixture into the rotating centrifugal drum.

10. The process of claim 2 wherein any emulsions in the mixture are broken or removed prior to injection in the input pipe.

11. The process of claim 2 wherein the oil delivery means lies below the top of the reservoir.